United States Patent [19]

Chang et al.

[11] Patent Number: 5,072,541

[45] Date of Patent: Dec. 17, 1991

[54] METHODS AND APPARATUS FOR DESTROYING SNAILS

[76] Inventors: Milton M. T. Chang, 7 Trafalgar, Newport Beach, Calif. 92660; Luc P. Benoit, 2551 Colorado Blvd., Los Angeles, Calif. 90041-1040

[21] Appl. No.: 922,164

[22] Filed: Oct. 23, 1986

[51] Int. Cl.$^5$ .................. A01M 23/08; A01M 1/10
[52] U.S. Cl. ................................. 43/124; 43/110
[58] Field of Search .............. 43/75, 77, 110, 111, 43/107, 124, 132.1, 131

[56] References Cited

U.S. PATENT DOCUMENTS

| | | | |
|---|---|---|---|
| 98,984 | 1/1870 | Little | 43/110 |
| 200,574 | 2/1878 | Schreiber et al. | |
| 201,916 | 4/1878 | Ensing | |
| 1,439,874 | 12/1922 | Dillin | 43/110 |
| 1,473,538 | 11/1923 | Bakke | 43/110 |
| 1,543,968 | 6/1925 | Williams et al. | |
| 3,043,046 | 7/1962 | McCoy et al. | |
| 3,872,619 | 3/1975 | McIlwain | |
| 3,996,690 | 12/1976 | Ridings | |
| 4,035,946 | 7/1977 | Rapp | 43/131 |
| 4,174,586 | 11/1979 | Burzdak | |
| 4,179,499 | 12/1979 | Christensen | 424/142 |
| 4,251,946 | 2/1981 | Lindley | 43/131 |
| 4,328,637 | 5/1982 | Eichmuller et al. | |
| 4,349,980 | 9/1982 | McKee | 43/75 |
| 4,434,574 | 3/1984 | Benito | 43/63 |

FOREIGN PATENT DOCUMENTS

| | | | |
|---|---|---|---|
| 2405615 | 5/1979 | France. | |
| 243981 | 3/1947 | Switzerland | 43/111 |

Primary Examiner—Kurt Rowan

[57] ABSTRACT

Methods and apparatus for destroying snails avoid a cleanup problem by causing live snails to cannibalize snail carcasses. To this end, snail carcasses are provided in a trap which is made accessible to live snails for consumption of the snail carcasses. The trap preferably is of a collapsible type or is otherwise provided with first volume permitting entry of live snails into the trap, and is reducible to a second volume insufficient to accommodate live snails, whereby such live snails are crushed. Further live snails are then permitted to cannibalize the crushed snails by restoring the trap to its first volume for entry of the further live snails into the trap. The first volume may be reduced to the second volume against a bias, which is employed to restore the trap to its first volume. Operation of these methods and apparatus may be tied in with a sprinkler system or other apparatus for providing a pressurized medium from time to time. In that case, the live snails may be crushed in the trap with that pressurized medium or the trap may be actuated from time to time with pressure from water applied to a sprinkler system.

34 Claims, 2 Drawing Sheets

METHODS AND APPARATUS FOR DESTROYING SNAILS

BACKGROUND OF THE INVENTION

1. Field of the Invention

The subject invention relates to methods and apparatus for destroying mollusca or gastropoda, herein referred to a snails, and, more specifically, to snail trapping and carcass cleanup methods and snail traps.

2. Information Disclosure Statement

Traps for snails and other animals have been proposed, and to a large extent used, for a long time.

For example, French Utility Patent 2,405,615 describes a trap for snails having a cylinder that is formed with closures for its ends and is provided with an edge slit to allow entry of snails. This entrance is covered by thin strips of material that allow entrance into the trap while preventing attempts of snails to exit the trap. A major concern of that French inventor was to preserve the trapped snails for human consumption as escargots. This, of course, presents a problem, if the objective is to destroy the snails, rather than to eat them.

U.S. Pat. No. 4,328,637, by Eichmuller et al., discloses a snail trap of the type containing a preferably alcoholic liquid that is used as the bait and as the means for drowning the inebriated snails. This generates a cleanup problem, since the drowned snails have to be removed from the trap and have to be disposed of somehow.

This also applies to the fly trap disclosed in U.S. Pat. No. 1,473,538, by R. A. Bakke, in which two plates are spring biased apart and adapted to be forced together by a sharp blow or stroke of the hand. U.S. Pat. No. 3,996,690, by R. W. Ridings, discloses a combined trap and swatter. U.S. Pat. No. 3,043,046, by T. R. McCoy et al, discloses a crushing device that is operated by a windmill.

U.S. Pat. No. 4,174,586, by L. Burzdak, discloses a bug catcher, as does U.S. Pat. No. 201,916, by W. D. Ensign.

U.S. Pat. No. 3,872,619 by I. McIlwain, U.S. Pat. No. 1,543,968, by S. H. Williams et al., and U.S. Pat. No. 200,574, by F. Schreiber et al, disclose various traps for rodents and insects. For instance, McIlwain discloses the use of a double container.

All these traps and proposals leave either live or dead animals or insects that have to be disposed of in some manner. In the case of snails, this creates a rather messy and disgusting cleanup problem, so that snail traps are relatively seldom used. In consequence, snail poisons are used a lot, presenting a danger of environmental pollution or, occasionally, a danger to small children and pets.

Moreover, many people have resigned themselves to the lack of an effective and acceptable snail trapping and disposal system, and, in consequence, have simply let their gardens and surroundings go, so that there is nothing important for the snails to get. This, of course, does nothing to improve the neighborhood or to encourage planting of vegetables and flowers, or to promote the maintenance of vineyards and commercial agriculture.

Some promoters have offered comfort to blighted gardeners by selling them so-called "killer snails" which are supposed to eat up the plant-eating snails. However, the ultimate question presents itself, "Who is going to kill the killer snails?"

SUMMARY OF THE INVENTION

It is a general object of this invention to overcome the disadvantages and to meet the needs expressed or implicit in the Information Disclosure Statement or in other parts hereof.

It is a related object of this invention to provide improved methods and apparatus for destroying snails.

It is a germane object of this invention to provide improved methods and apparatus for disposing of snails.

It is also an object of this invention to provide improved snail traps.

Other objects of this invention will become apparent in the further course of this disclosure.

From a first aspect thereof, the subject invention resides in a method of destroying snails and, more specifically, resides in the improvement comprising, in combination, the steps of providing a snail trap, and having live snails to cannibalize snail carcasses by providing said snail carcasses in said trap, and by making said trap accessible to said live snails for consumption of said snail carcasses, and converting said live snails to further snail carcasses in said trap.

From a related second aspect thereof, the subject invention resides in a method of destroying snails and, more specifically, resides in the improvement comprising, in combination, the steps of providing a snail trap having a first volume permitting entry of live snails into said trap, reducing said first volume to a second volume insufficient to accommodate said live snails whereby said live snails are crushed, and permitting further live snails to cannibalize said crushed snails by restoring said trap to said first volume for entry of said further live snails into the trap.

From a related third aspect thereof, the subject invention resides in apparatus for destroying snails comprising, in combination, a snail trap, and means for providing the snail carcasses in the trap, including a temperature sensitive device for actuating said trap and means for rendering the trap accessible to the live snails for consumption of the snail carcasses, said means for providing snail carcasses including means for killing live snails in said trap.

From a related fourth aspect thereof, the subject invention resides in methods and apparatus for destroying snails comprising, in combination, the steps of, or means for, providing a snail trap, providing a pressurized medium from time to time, crushing live snails in the trap with the pressurized medium to provide snail carcasses in the trap, and making the trap accessible to further live snails for consumption of the snail carcasses.

In this respect, a sprinkler system for vegetation irrigation purposes may be provided to which pressurized water is applied from time to time, and the snail carcasses may be provided automatically by crushing live snails in the trap with pressure from the pressurized water applied to the sprinkler system.

From a related further aspect thereof, the subject invention resides in methods and apparatus for disposing of animals with a trap, and, more specifically, resides in the improvement comprising in combination the steps of, or means for, providing a sprinkler system for vegetation irrigation purposes with a control for that sprinkler system and for the trap, rendering the trap controllable for disposal of animals in response to the control, and controlling the sprinkler system and the trap with that control.

Other aspects of the invention will become apparent in the further course of this disclosure, and no restriction whatever is intended by this Summary.

BRIEF DESCRIPTION OF THE DRAWINGS

The subject invention and its various objects and aspects will become more readily apparent in the following detailed description of preferred embodiments thereof, illustrated by way of example in the accompanying drawings, in which like reference numerals designate like or functionally equivalent parts, and in which.

DESCRIPTION OF PREFERRED EMBODIMENT

Figure 1:
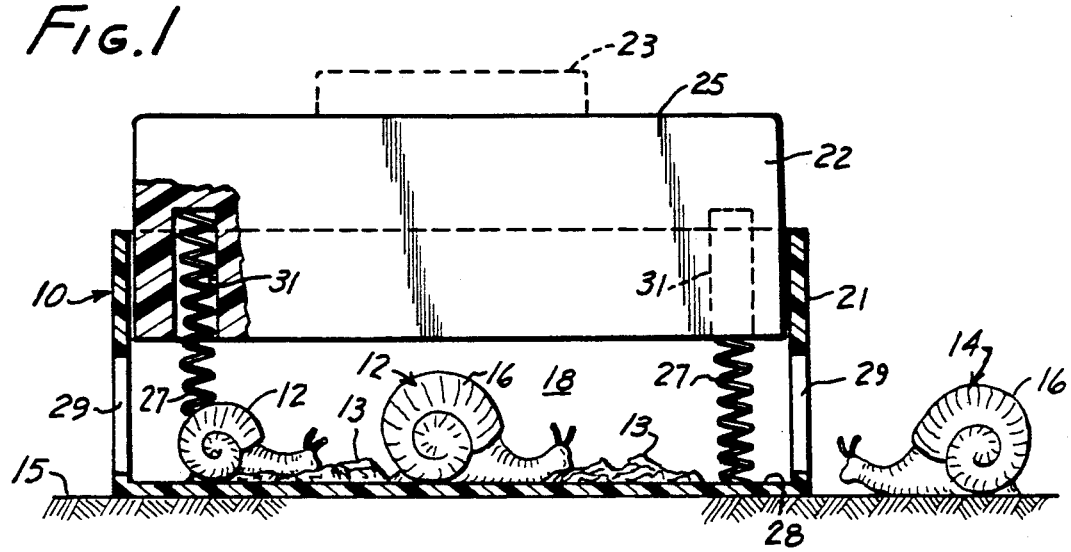
FIG. 1 is a side view, partially in section, of a snail trap and snail destruction method according to a preferred embodiment of the subject invention.
Figure 2:
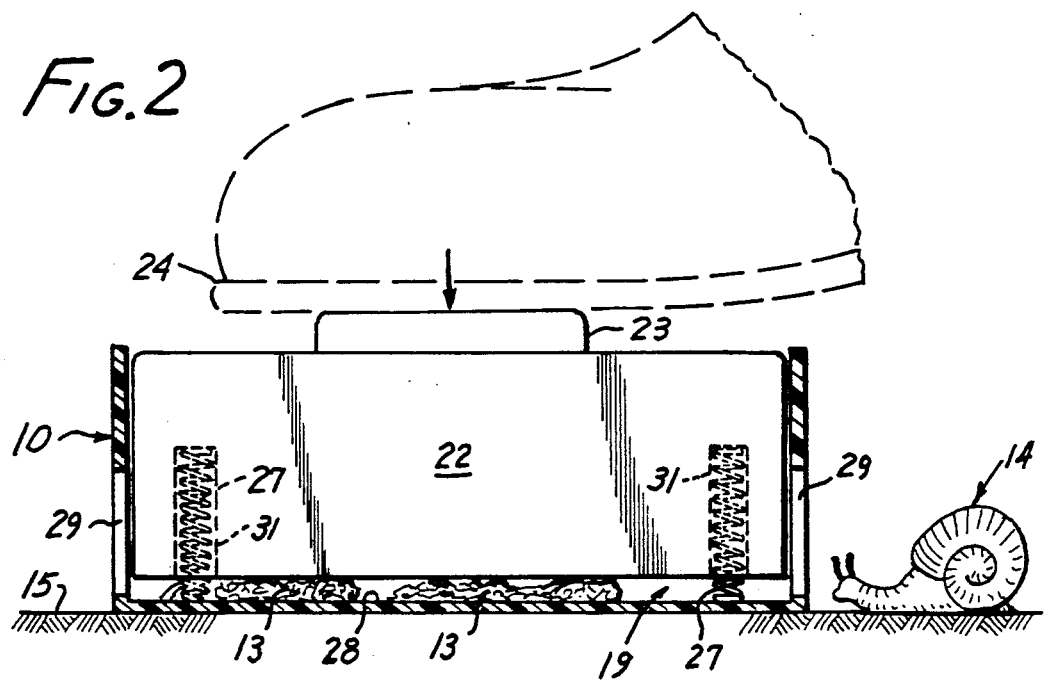
FIG. 2 is a view similar to FIG. 1, showing a further phase in the destruction of snail according to the illustrated embodiment of the subject invention.

FIGS. 1 and 2 show a snail trap 10 with means for causing live snails 12 to cannibalize snail carcasses 13 in the trap, and means for rendering such trap accessible to live snails 14 for consumption of the snail carcasses, as more fully disclosed herein.

In practice, the snail trap 10 typically is provided or positioned on a surface 15, such as the ground outdoors, where snails live or pass by.

The invention may be practiced with all kind of self-cannibalizing mollusca, gastropoda, or snails.

According to the illustrated preferred embodiment of the invention, live snails 12 are caused to cannibalize snail carcasses by providing such snail carcasses 13 in the trap, and by making such trap 10 accessible to live snails 12 and 14 for consumption of the snail carcasses. According to a preferred embodiment of the subject invention, the snail carcasses 13 are provided by killing or crushing live snail in the trap 10, as will be more fully described in connection with FIG. 2.

The snail trap 10, as provided according to the illustrated preferred embodiment of the invention, has a first volume 18 permitting entry of live snails into the trap, as shown in FIGS. 1 and 2.

According to FIG. 2, the first volume 18 is reduced to a second volume 19 insufficient to accommodate the live snails, whereby such live snails 12 are crushed into carcasses 13 which, in practice, may be aided by a crushing of the shell 16 of each snail 12.

According to the illustrated preferred embodiments of the invention, further live snails are permitted to cannibalize the crushed snails 13 by restoring the trap 10 to the first volume 18 for entry of such further live snails 14 into the trap. In other words, the illustrated preferred embodiment of the invention converts live snails 12 to further carcasses in the trap and has such further snail carcasses consumed by further live snails in the trap 10.

The illustrated trap 10 includes a container 21 for the live snails 12 or 14 and the carcasses 13. The illustrated means for providing snail carcasses 13 include a piston 22 slidable in the container for crushing snails 12 present in that container 21. The piston 22 may include a footrest 23 for receiving a human foot or a shoe 24. However, as indicated by dotted lines at 23 in FIG. 1, a special footrest may be omitted and an upper surface or portion 25 of the piston 22 may serve as a footrest instead.

The trap 10 includes bias springs 27 for rendering the trap accessible to live snails by biasing the piston 22 away from the bottom 28 of the container. The container 21, in turn, has access holes 29 for live snails 12 and 14.

In the illustrated embodiment, the bias springs 27 extend into corresponding cavities 31 in the movable trap part or piston 22. However, other designs or constructions, are, of course, possible.

The bias springs 27 or equivalent means serve to store energy while the first volume 18 is reduced to the second volume 19 of the trap. That stored energy is then employed to restore the trap 10 to its first volume 18, as seen in FIG. 1.

In other words, the illustrated preferred embodiment reduces the first volume 18 to the second volume 19 against a bias, and employs that bias to restore the trap 10 to its first volume 18.

By rendering the illustrated or equivalent snail traps collapsible for crushing live snail, the preferred embodiment of the invention not only kills the particular snails 12, but, as verified by actual tests, at the same time provides the bait for further live snails 14 in the form of the crushed carcasses 13. Further live snails 14 will thus be attracted into the trap 10, where they will cannibalize the snail carcasses 13 now acting as a snail bait.

Accordingly, the subject invention is very friendly to the environment preferred by gardeners and householders, by not only killing undesired snails, but by disposing at the same time of their carcasses. The subject invention thus naturally avoids the messy and disagreeable cleanup problem caused by prior-art traps. In this respect, fragments of shells 16 cause no problem, since they are easily shaken out of the trap openings 29 and are not as disgusting as the snail carcasses themselves.

The subject invention is also friendly to the environment by effectively avoiding the need for snail poisons and other environmental pollutants.

Of course, a responsible person will not use these traps unnecessarily, but will only employ them to dispose of snails that do damage in, and are a nuisance to, gardens, areas around houses, and similar environments. The trap according to the subject invention may be automated, such as by a mechanism operated by a timer or other periodic or aperiodic device, to sequentially reduce the volume of the trap from 18 to 19, and expand the same from 19 back to 18, and so forth.

Figure 3:
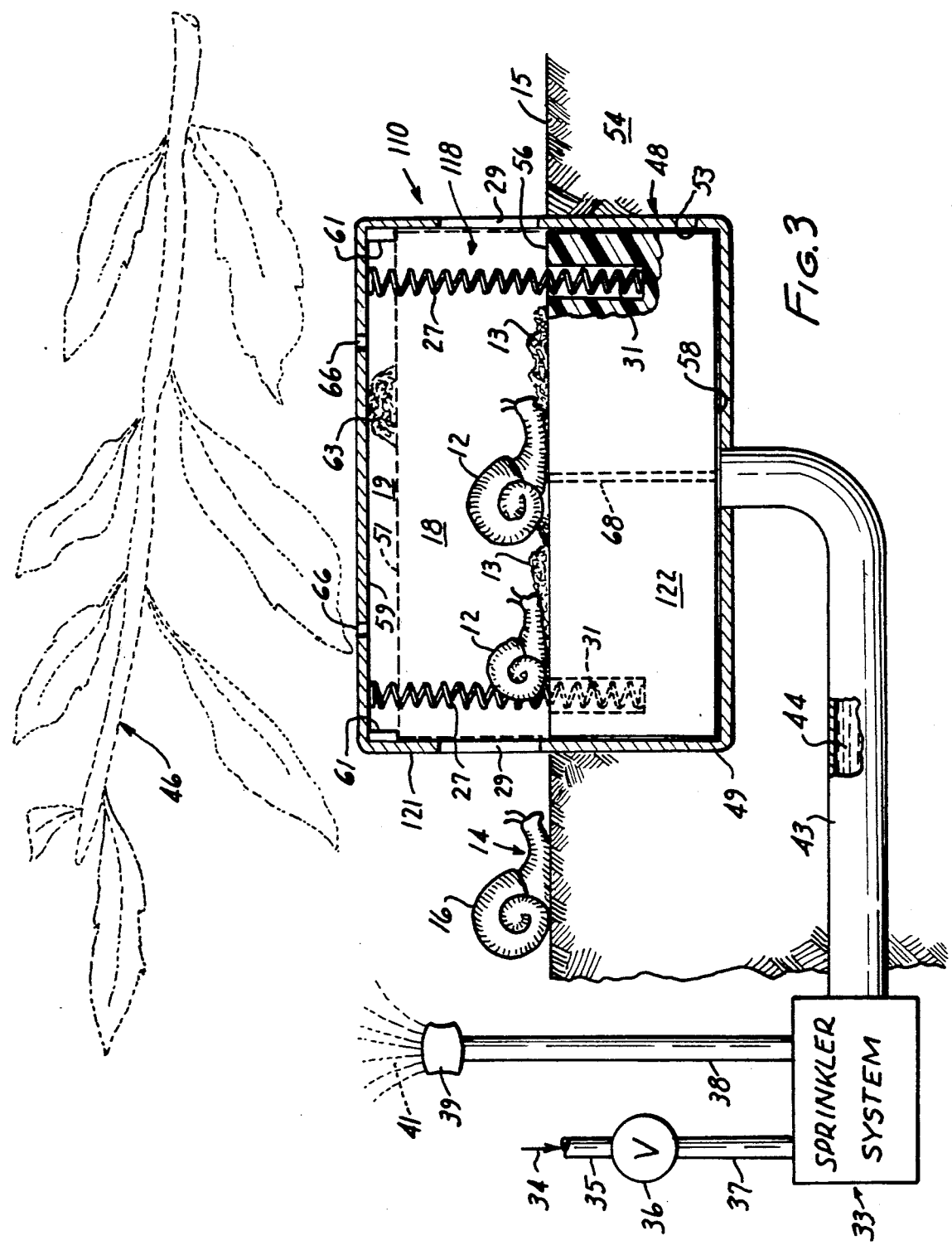
FIG. 3 is a side view, partially in section, of a snail trap system and snail destruction method according to a further preferred embodiment of the subject invention.

By way of example, FIG. 3 shows a block diagram of a sprinkler system 33 to which pressurized water is applied from time to time. For instance, pressurized water 34 may be applied to the sprinkler system from a water main 35 upon the temporary opening of a suitable valve 36 to which the sprinkler system 33 is connected by a water pipe 37.

The preferably underground sprinkler system has one or more water pipes 38 extending to sprinklers or sprinkler heads 39 which emit mists, sprinkles or jets of water 41 for irrigation purposes.

As seen in FIG. 3, the snail trap 110 shown therein is connected to the sprinkler system 33 by a further conduit or pipe 43, for actuation by the pressurized water 44 supplied by or occurring in the sprinkler system from time to time. In this respect, the sprinkler system 33 may, for instance, be a system that is turned on from time to time to irrigate grass, plants 46 or other vegetation or that is coincidentally energized to actuate one or more snail traps 110.

The snail trap 110 includes a container 121 for the live snails 12 or 14 and the carcasses 13. The means illustrated for providing snail carcasses 13 include a piston 122 slideable in the container for crushing snails 12 present in that container 121.

In principle, the construction of the trap 110 may essentially be the same as that for the trap 10. In that case, one typically would extend the housing 21 of the trap 10 upwardly to form a cylinder about the upper region of the piston 22, to which the sprinkler conduit 43 would then be connected in order to perform the functional equivalent of the foot 24 in moving the piston 22 downwardly from time to time towards the bottom 28 of the container against the bias of springs 27, so as to crush live snails 12 in the trap into carcasses 13.

However, the preferred embodiment illustrated in FIG. 3 is more adapted to the use of the subject kind of snail traps in conjunction with underground sprinkler systems. In particular, the trap 110 shown in FIG. 3 has an upper snail receiving and crushing area or first region 118 and a lower cylinder and piston area or second region 48.

The cylinder of that lower region 48 which contains the piston 122 for sliding motion therein, is formed by a downward extension 49 of the housing 121, which may duplicate or mirror the upper portion of that housing, except for certain apertures, including the snail access holes 29, which are only provided in the upper region of the housing 121.

Of course, the cylinder structure for the piston 122 extends from the lower region 48 into the upper region 118, so as to permit the piston 122 to advance from its solidly illustrated rest position to its upper position shown by dotted lines 51 in FIG. 3. In principle, the circumferential lateral portion of the housing 121, forming the cylinder for the piston 122, may, indeed, be cylindrical, in which case the piston 122 would also be cylindrical. However, the expression "cylinder" has herein employed for the housing of the piston 122 is a technical term borrowed from such equipment as piston pumps and engines, and does not necessarily denote a hollow-cylindrical configuration for the container 21 or 121. Rather, that container and the piston 22 or 122 sliding therein may be square, rectangular or have any other configuration as desired or necessary for a particular kind of snail trap.

As may be seen from FIG. 3, the lower trap region 48 may be sunk into a hole 53 dug or otherwise provided for that purpose in the ground 54 in which the sprinkler system 33 is installed. In that case, the upper region 118 of the trap 110 projects above the ground surface 15 along which the snails are creeping.

The upper cross-section or face of the piston 122 then acts as a floor 56 in the trap 110 onto which live snails can creep through the trap access openings 29 in order to feast on the previously provided snail carcasses 13. As in the case of the trap 10, that operation may be primed by first putting some lettuce, delectable succulents or snail bait into the trap, unless one prefers to crush a few snails for openers.

Whenever the sprinkler system 33 is turned on, pressurized water 44 proceeding through the conduit 43 acts on the lower cross-section or face 58 of the piston, thereby forcing that piston 122 upwardly against the bias of the springs 27. This, of course, lifts the trap floor 56, and the snails located thereon, toward the top 59 of the trap. The above mentioned first volume 18 of the trap is thereby automatically reduced to the smaller second volume 19 with pressure from the pressurized water 44 applied to or by the sprinkler system 33, whereby the live snails 12 are automatically crushed between the upper face 56 of the piston and the ceiling 59 of the trap 110.

Internal notches or stops 61 may be provided in the trap, so as to give the second volume 19 a sufficient minimum height to avoid such damage to the resulting snail carcasses 13, as to make them unattractive to live snails for consumption thereby. Similar volume control limit notches or stops may also be provided at the bottom 28 of the trap 10.

FIG. 3 shows snail carcasses 63 thus provided on the raised movable floor 56 of the trap. These serve as carcasses 13 which are consumed by further snails 18 attracted thereby to the trap 110 when the trap floor 56 is lowered again. In practice, such lowering typically takes place automatically by the force of the energy stored in the compressed springs 27. Vent holes 56 may be provided in the top of the trap unless a buildup of a certain pressure therein, when the piston 122 raises, is beneficial for the operation of the trap. Similar vent holes, with or without check valves (not shown), may be provided at the bottom of the trap or through the piston 122, in order to relieve pressure therefrom when the sprinkler system is turned off and the piston 122 is supposed to return to its solidly illustrated position. In this respect, an optional orifice 68 is shown as extending through the piston 122.

However, a special pressure relief feature will not be generally necessary in the case of traps actuated by sprinkler systems. For instance, if the valve 36 is turned off, then further supply of pressurized water 44 will cease and the pressure still in the system can relieve itself through sprinkler heads 39 or through the antisyphon valve with which sprinkler systems have to be equipped by local ordinance in most communities.

Nevertheless, an orifice 68 may still be beneficial for flushing the trap from time to time, or may be seen as symbolic for an outlet which flushes the trap from time to time with water from the sprinkler system 33. Nonedible debris, such as crushed shells or snail housings 16 may thus be removed from the trap. Of course, such occasional flushing is not carried to the point where the edible snail carcasses 13 themselves would be flushed from the trap.

The traps 10 and 110 form shady areas to which live snails are attracted. This effect may be further enhanced by situating the traps under foliage 46 or in other dark places accessible to snails.

The sprinkler system 33 may be manually actuated or may be of a type actuated automatically by an electric clock and solenoids or similar devices. In that manner, the sprinkler system can be cycled for the best effect of the trap on live snails, considering their natural living and feeding habits.

In a broad sense within the scope of the subject invention, the sprinkler system 33 may be seen as symbolic of any system that periodically or aperiodically actuates the trap 110. For instance, an electric clock or timer, which may be the same that operates a sprinkler system, may be employed for actuating the trap directly, electromagnetically or electrohydraulically, at certain times attuned to the living and eating habits of the snails.

Alternatively, the system 33 may be provided by a bimetallic or other temperature-sensitive device which may, for instance, be actuated diurnally by the sun, or conversely, which may respond nocturnally to the cool of the night, so as to actuate the trap successively between large and small volumina in a rhythm best attuned to the snails' living and feeding habits.

In the later case, the trap could be disposed entirely above ground. For instance, the trap shown in FIG. 3 could be turned upside down whereby the top 59 in effect becomes the bottom resting on the soil surface 15. Also in that case, the automatic piston actuating device or mechanism could be placed on the top of the inverted trap in the vicinity of the cross-section 58 of the piston.

Accordingly, within a broad scope thereof, the preferred aspect of the invention illustrated in FIG. 3 provides a pressurized medium from time to time, and provides the snail carcasses by crushing live snails in the trap with such pressurized medium, of which the water 44 is symbolic and of the source of which the sprinkler system 33 is also symbolic in a broad sense.

Also, the block 33 in FIG. 3 may be viewed as symbolic of a control provided for the sprinkler system and for the trap. In this respect, electrical clocks and timers are known for turning sprinkler systems on and off at predetermined times and for pre-set intervals. In that case, the electric clock or control could be in the block 33 together with a valve actuated thereby for connecting the sprinkler 39 via pipes 37 and 38 to a water main 35 via a then open gate valve 36. Also in that case, the clock or control in the block 33 could interconnect the pipes 37 and 43 through another valve for actuating the trap 110. One advantage of such an arrangement would be that the trap 110 could be actuated independently of the sprinkler 39 by appropriate settings provided on the block to switch the sprinkler on and off at certain times and to actuate the trap at overlapping or other times.

In such cases, the sprinkler system and the trap can be controlled automatically with the above mentioned control at 33.

The scope of the subject invention is not limited to destroying or disposing of snails, but extends to methods and apparatus for disposing other predetermined animals with a trap. From that broad aspect thereof, the invention resides in the improvement comprising, in combination, the steps of providing a sprinkler system with a control 33 or 36 for that sprinkler system and for the trap, rendering the trap controllable for disposal of animals in response to the mentioned control, and controlling the sprinkler system and the trap with that control.

It will be noted that the sprinkler system is part of the combination just recited. This is so with good reason, since sprinkling or watering has an effect on the manner and ways in which snails wander, thereby influencing their progress to the open trap 110. This is also the case with snakes and other small animals, so that the subject invention is not limited to a disposal of snails.

Of course, the subject invention and its implementation are not limited to the embodiments shown in the drawings, but extend to other embodiments and versions within the spirit and scope of the invention.

In apparatus terms, it may be said that the invention resides in apparatus for disposing of animals with a trap, and, more specifically, in the improvement comprising, in combination, a sprinkler system having a control 33 or 36 for that sprinkler system and for the trap 110, and means connected to that trap, such as the pipe 43, piston 122 etc., for rendering the trap controllable for disposal of the animals in response to the above mentioned control.

The embodiment illustrated in FIG. 3 is within the scope of the broad aspects of the invention just recited, in that it provides pressurized water 34 to the sprinkler system in response to the control at 33 or 36, and in that it actuates the trap 110 in response to that pressurized water, such as shown at 44 in FIG. 3, by way of example, and not by way of limitation.

The subject extensive disclosure suggests and renders apparent to those skilled in the art various modifications and variations within the spirit and scope of the subject invention and equivalents thereof.

We claim:
1. In a method of destroying snails, the improvement comprising in combination the steps of:
   providing a snail trap;
   having live snails cannibalize snail carcasses by providing said snail carcasses in said trap, and by making said trap accessible to said live snails for consumption of said snail carcasses; and
   converting said live snails to further snail carcasses in said trap.
2. A method as claimed in claim 1, including the steps of:
   restoring said trap for entry of further live snails into said trap, and
   having said further snail carcasses consumed by said further live snails in said trap.
3. A method as claimed in claim 1, wherein:
   said snail carcasses are provided by killing live snails in said trap.
4. A method as claimed in claim 1, wherein:
   said snail carcasses are provided by crushing live snails in said trap.
5. A method as claimed in claim 1, including the steps of:
   providing a pressurized medium from time to time; and
   providing said snail carcasses by crushing live snails in said trap with said pressurized medium.
6. A method as claimed in claim 1, including the steps of:
   providing a sprinkler system for vegetation irrigation purposes;
   applying pressurized water to said sprinkler system from time to time for vegetation irrigation purposes; and
   automatically providing said snail carcasses by crushing live snails in said trap with pressure from said pressurized water applied to said sprinkler system.
7. A method as claimed in claim 1, including the steps of:
   providing a sprinkler system for vegetation irrigation purposes;
   providing a control for said sprinkler system and for said trap; and
   automatically controlling said sprinkler system and said trap with said control.
8. In a method of destroying snails, the improvement comprising in combination the steps of:
   providing a snail trap having a first volume permitting entry of live snails into said trap;
   reducing said first volume to a second volume insufficient to accommodate said live snails whereby said live snails are crushed; and
   permitting further live snails to cannibalize said crushed snails by restoring said trap to said first volume for entry of said further live snails into the trap.

9. A method as claimed in claim 8, including the steps of:
reducing said first volume to said second volume against a bias; and
employing said bias to restore said trap to said first volume.

10. A method as claimed in claim 8, including the steps of:
storing energy while reducing said first volume to said second volume; and
employing said stored energy to restore said trap to said first volume.

11. A method as claimed in claim 8, including the steps of:
providing a pressurized medium from time to time; and
applying said pressurized medium to said trap to reduce said first volume to said second volume whereby said live snails are crushed.

12. A method as claimed in claim 8, including the steps of:
providing a sprinkler system for vegetation irrigation purposes;
applying pressurized water to said sprinkler system from time to time for vegetation irrigation purposes; and
automatically reducing said first volume to said second volume with pressure from said pressurized water applied to said sprinkler system whereby said live snails are automatically crushed.

13. A method as claimed in claim 8, including the steps of:
providing a sprinkler system for vegetation irrigation purposes;
providing a control for said sprinkler system and for said trap; and
automatically controlling said sprinkler system and said trap with said control.

14. In a method of disposing of animals with a trap, the improvement comprising in combination the steps of:
providing a sprinkler system for vegetation irrigation purposes with a control for that sprinkler system and for said trap;
rendering said trap controllable for disposal of said animals in response to said control; and
controlling said sprinkler system and said trap with said control.

15. A method as claimed in claim 14, including the steps of:
providing pressurized water to said sprinkler system in response to said control for vegetation irrigation purposes; and
actuating said trap in response to said pressurized water.

16. Apparatus for destroying snails, comprising in combination:
a snail trap;
means for providing snail carcasses in said trap including a temperature-sensitive device for actuating said trap; and
means for rendering said trap accessible to said live snails for consumption of said snail carcasses;
said means for providing snail carcasses including means for killing live snails in said trap.

17. Apparatus as claimed in claim 16, wherein: said means for providing snail carcasses include means for crushing live snails in said trap.

18. Apparatus as claimed in claim 16, wherein:
said trap has a first volume permitting entry of live snails into said trap; and
said means for providing snail carcasses include means for enabling reduction of said first volume to a second volume insufficient to accommodate live snails in said trap, whereby said live snails are crushed.

19. Apparatus as claimed in claim 18, wherein: said means for rendering said trap accessible to live snails include means for restoring said trap to said first volume.

20. Apparatus as claimed in claim 18, wherein: said means for rendering said trap accessible to live snails include means for storing energy during said reduction of said first volume to said second volume, and for applying said stored energy to said trap for restoring said trap to said first volume.

21. Apparatus as claimed in claim 16, wherein: said snail trap is collapsible for crushing live snails.

22. Apparatus as claimed in claim 21, wherein: said means for rendering said trap accessible to live snails include means for restoring said trap from a collapsed condition.

23. Apparatus as claimed in claim 21, wherein: said trap includes a footrest for actuating said trap to a collapsed condition.

24. Apparatus for destroying snails, comprising in combination:
a snail trap having a first volume permitting entry of live snails into said trap; and
means for providing snail carcasses including means for receiving a pressurized medium and means for reducing said first volume in response to said pressurized medium to a second volume insufficient to accommodate live snails in said trap, whereby said live snails are crushed.

25. Apparatus as claimed in claim 16, including:
a sprinkler system for vegetation irrigation purposes receiving pressurized water from time to time;
said trap having a first volume permitting entry of live snails into said trap; and
said means for providing snail carcasses including means connected to said sprinkler system for reducing said first volume in response to pressure from said water to a second volume insufficient to accommodate live snails in said trap, whereby said live snails are crushed.

26. Apparatus as claimed in claim 16, wherein:
said snail trap includes a container for said live snails and said carcasses; and
said means for providing snail carcasses include a piston slidable in said container for crushing snails present in said container.

27. Apparatus as claimed in claim 26, wherein: said piston includes a footrest for actuation of said piston.

28. Apparatus as claimed in claim 26, wherein: said means for rendering said trap accessible to live snails include means for biasing said piston away from a bottom of said container.

29. Apparatus as claimed in claim 26, wherein: said container has access holes for live snails.

30. Apparatus as claimed in claim 16, wherein:
said snail trap includes a container for said live snails and said carcasses; and said means for providing snail carcasses include piston means slideable in said container for crushing snails present in said container, and means for activating said piston in response to a pressurized medium.

31. Apparatus as claimed in claim 16, including:

a sprinkler system for vegetation irrigation purposes for receiving pressurized water from time to time;

said snail trap including a container for said live snails and said carcasses and means for connecting said container to said sprinkler system; and said means for providing said snail carcasses include piston means slidable in said container in response to said pressurized water for crushing snails present in said container.

32. Apparatus as claimed in claim 16, including:

a sprinkler system for vegetation irrigation purposes;

a control for said sprinkler system and for said trap; and means in said trap for crushing live snails in said trap in response to said control.

33. In apparatus for disposing of animals with a trap, the improvement comprising in combination:

a sprinkler system for vegetation irrigation purposes having a control for that sprinkler system and said trap; and means connected to said trap for rendering said trap controllable for disposal of said animals in response to said control.

34. Apparatus as claimed in claim 33, including:

means for supplying pressurized water to said sprinkler system in response to said control for vegetation irrigation purposes; and means for activating said trap in response to said pressurized water.

* * * * *